United States Patent [19]

Takahashi

[11] 4,145,136
[45] Mar. 20, 1979

[54] SCANNING SYSTEM FOR AN ELECTROSTATIC COPYING APPARATUS

[75] Inventor: Toru Takahashi, Tokyo, Japan

[73] Assignee: Canon Kabushiki Kaisha, Tokyo, Japan

[21] Appl. No.: 640,284

[22] Filed: Dec. 12, 1975

[30] Foreign Application Priority Data

Dec. 23, 1974 [JP] Japan ............................... 49-147793

[51] Int. Cl.² ...................... G03G 15/24; G03G 15/28
[52] U.S. Cl. ........................................... 355/8; 355/67
[58] Field of Search .............................. 355/8, 3 R, 67

[56] References Cited

U.S. PATENT DOCUMENTS

| | | | |
|---|---|---|---|
| 3,432,231 | 3/1969 | Gardner | 355/8 |
| 3,834,807 | 9/1974 | Fuller et al. | 355/8 X |
| 3,907,424 | 9/1975 | Komori et al. | 355/51 X |
| 3,914,044 | 10/1975 | Ogawa | 355/8 |
| 3,985,438 | 10/1976 | Kurita | 355/67 X |
| 3,995,950 | 12/1976 | Townsend | 355/67 X |

*Primary Examiner*—Fred L. Braun
*Attorney, Agent, or Firm*—Fitzpatrick, Cella, Harper & Scinto

[57] ABSTRACT

A copying apparatus having a stationary or movable original to be copied, a lens movable parallel to the original and perpendicular to its optical axis, a photosensitive medium movable parallel to the lens and a flash lamp device for illuminating the entire surface of the original wherein movement of the elements satisfies the condition $$\left| \frac{V_1 - V_1'}{V_1} \right| < \frac{1}{8},$$

where $V_1$ is the velocity of movement of the photosensitive medium and $V_1'$ the velocity of movement of the light image at the surface of the medium.

1 Claim, 4 Drawing Figures

SCANNING SYSTEM FOR AN ELECTROSTATIC COPYING APPARATUS

BACKGROUND OF THE INVENTION

1. Field of the Invention

This invention generally relates to a copying apparatus. More particularly, it relates to a copying apparatus in which a movable planar photosensitive medium is entirely exposed to a stationary or movable planar light image surface by a flash light source.

2. Description of the Prior Art

An exposure device wherein a movable planar photosensitive medium is exposed to light from a flash light source has been advantageous in that the optical system involved therein is simple in construction and yet exposure can be repetitively effected at high speed, while on the other hand efforts to shorten the flashing time have led to the expensiveness and bulkiness of the flash light source and its power source, which has formed a barrier in putting high-speed copying into practical use.

SUMMARY OF THE INVENTION

It is therefore an object of the present invention to provide a copying apparatus which has been improved to enable high-speed copying to be put into practical use by the utilization of a less expensive flash light source having a relatively long flashing time.

The present invention employs an overall flash exposure system comprising a combination of a stationary or movable original to be copied, a movable lens and a movable photosensitive medium.

The invention will become more fully apparent from the following detailed description thereof taken in conjunction with the accompanying drawings.

DESCRIPTION OF THE PREFERRED EMBODIMENTS

Figure 1:
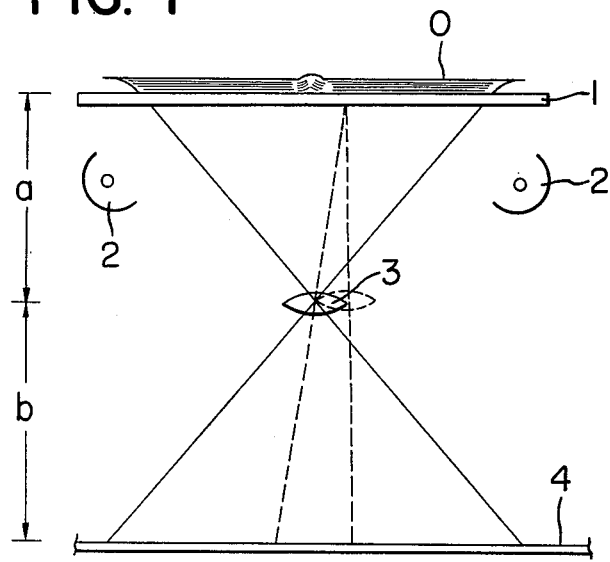
FIG. 1 schematically illustrates the optical system in the copying apparatus of the present invention.

Referring to FIG. 1, there is seen a stationary or movable original carriage 1 with an original 0 placed thereon, a stationary flash light source 2 for illuminating the original, a movable lens 3 and a movable planar photosensitive medium 4. Let the velocity of the photosensitive medium movement be $V_1$, the velocity of parallel movement of the lens be $V_2$, the velocity of the original movement be $V_3$, the distance between the original and the lens be a, and the distance between the lens and the photosensitive medium be b, and assume that the photosensitive medium is stationary. Then, the velocity $V_1'$ of movement of the light image at the surface of the photosensitive medium may be expressed as:

$$V_1' = b/a\,(V_2 - V_3) + V_2$$

The photosensitive medium is actually moving and therefore, when the velocity $V_1'$ is equal to the velocity $V_1$ of the photosensitive medium, there will be no reduction in resolving power even if the exposure time is longer as much as allowed by the above-described construction. Also, even though $V_1$ and $V_1'$ are not completely equal, a longer flashing time than has heretofore been available may be secured within a range allowed for the resolving power, as long as $V_1$ and $V_1'$ are in the same direction.

Figure 2:
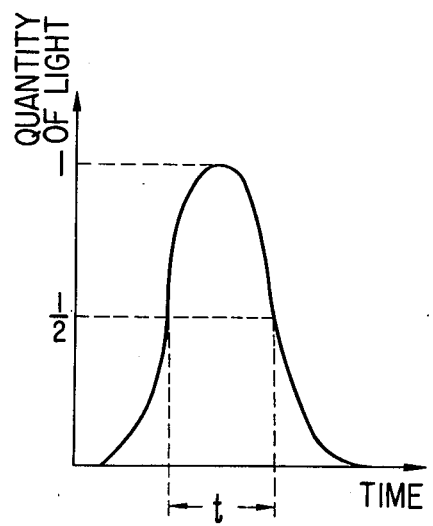
FIG. 2 is a graph for illustrating the flashing half-value width t.

Heretofore, in order to provide good resolution when flash exposure takes place using a stationary original, a stationary lens and a movable photosensitive medium, it has been necessary that the distance over which the photosensitive medium is moved relative to the projected image within the time represented by the flashing half-value width t (see FIG. 2) be half the thinnest line width to be resolved, or less. According to the present invention, if the condition that $$\left| \frac{V_1 - V_1'}{V_1} \right| < \frac{1}{2}$$

is satisfied, the flashing half-value width t may be increased to twice the conventional level, or more, and this means availability of smaller sizes and lower costs both for the light source and the power source. Thus, the object of the present invention may be achieved.

If the original is stationary, that is, if $V_3 = 0$, the following condition will be required:

$$V_1' = (b/a + 1)\,V_2$$

If copying is to be effected at 1x magnification, the following condition will be required:

$$V_1' = 2V_2$$

| Examples of Experiment | |
| --- | --- |
| Conditions of the exposure device: | |
| Stationary original | $V_3 = 0$ |
| Velocity of photosensitive medium | $V_1 = 1000$ mm/sec. |
| Velocity of lens | $V_2 = 500, 450, 250$. |
| (in the same direction as photosensitive medium) | 250, 0mm/sec. |
| Distance from photosensitive medium to lens | b = 280mm |
| Distance from lens to original | a = 280mm |

Relations of the upper limit of the flash exposure time half-value width with the velocity of the lens movement to provide a resolving power of 10 lines/mm.

| | Prior Art | invention 1 | 2 | 3 |
| --- | --- | --- | --- | --- |
| $V_2$ | 0 | | 500mm/sec. | 450mm/sec. | 250mm/sec. |
| $V_1 - V_1'$ | 1000mm/sec | $V_1 - V_1'$ | 0 | 100 | 500 |
| $\frac{V_1 - V_1'}{V_1}$ | 1 | | 0 | 1/10 | 1/2 |
| | 50μ sec. | Half-value width * | Unlimited | 500 μ sec. | 100 μ sec. |

*Actually, 1 msec. or so was the upper limit because of the limited angular aperture of the lens and because a smaller distance of the lens movement was advantageous in relation to the construction.

Description will now be made of the copying apparatus which embodies the present invention.

Figure 3:
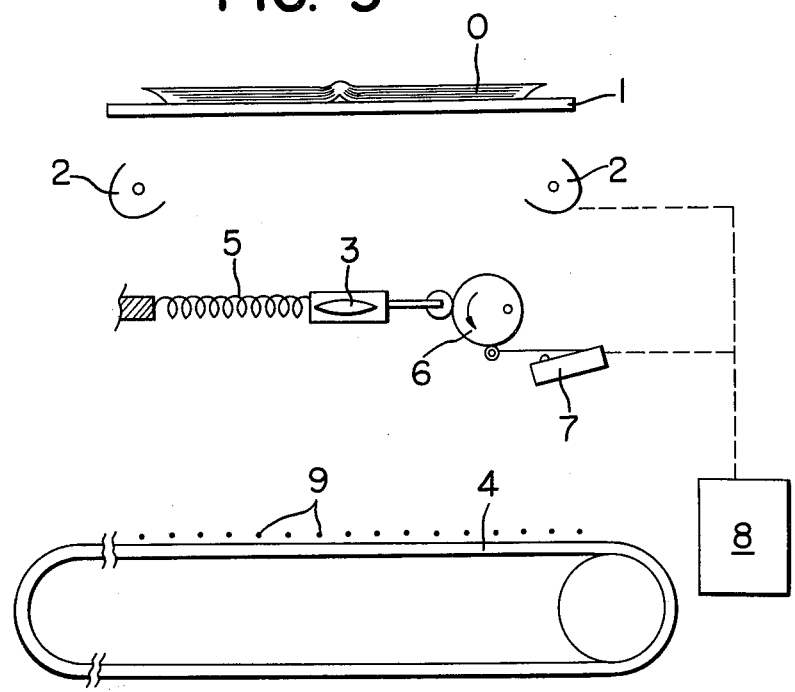
FIG. 3 specifically illustrates the copying apparatus of the present invention.

In FIG. 3, reference numerals 1 to 4 are similar in significance to those in FIG. 1.

Figure 4:
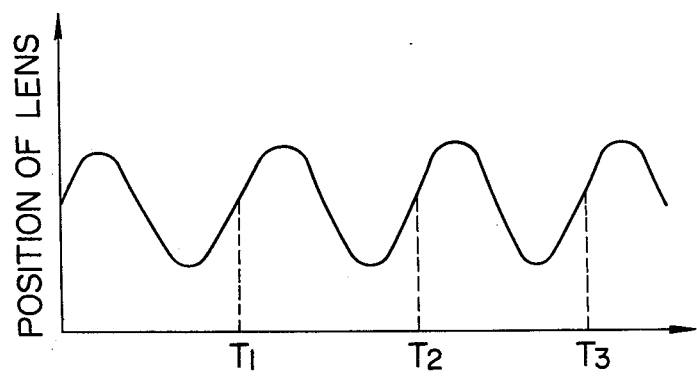
FIG. 4 graphically illustrates the relation of the lens position with the flashing time of the flash light source.

In this embodiment, the lens is supported by a resilient member 5 such as spring or the like and the lens is reciprocally moved or vibrated by an eccentric cam 6 against the force of the resiliency of the spring. When a predetermined velocity of movement is attained, the flash light source is turned on. In the shown embodiment, the eccentricity of the eccentric cam may be detected by a microswitch 7 to operate a control circuit 8, thereby effecting flash exposure. For example, as shown in FIG. 4, flashing is made to occur at points of time $T_1$, $T_2$ and $T_3$ in accordance with the vibration of the lens. When it is desired to carry out the simultaneous application of image light and corona discharge in the electrophotography disclosed in Japanese Patent Publication No. 23910/1967 or Japanese Patent Publication No. 24748/1968, charging or discharging may be effected simultaneously with exposure by a corona discharger having a number of corona discharge wires 9 extending along the surface to be exposed. Again in such case, there is an advantage that the flashing time can be selected to such a length that the corona wires create no shadow (the photosensitive medium being exposed is moved at a rate of 1mm for the wire of 0.1mm).

The copying apparatus of the present invention, as has been described above, permits the use of flash light source having a relatively long flashing time and this leads to the reduced cost of the light source and accordingly, reduced size and cost of the power source therefor, which means a very great advantage in the manufacture of high-speed copying machines.

What is claimed is:

1. A copying apparatus comprising a stationary or movable original holder, flash lamp means for illuminating the entire surface of an original on said holder, a lens movable in a direction perpendicular to its optical axis, a movable photosensitive medium having an image bearing surface for being exposed to a light image of said original projected through said lens, a plurality of fixed corona wires disposed adjacent the surface of the photosensitive medium for charging or discharging the surface of said photosensitive medium simultaneously with the exposure thereof to said light image, and means for establishing relative movement of said lens and photosensitive medium to satisfy the relation:

$$\left| \frac{V_1 - V_1'}{V_1} \right| \leq \tfrac{1}{2} ,$$

where $V_1$ is the velocity of movement of said photosensitive medium and $V_1'$ the velocity of movement of the light image at the surface of said photosensitive medium, wherein said photosensitive medium is moved at a rate of at least 1mm. per 0.1mm of corona wire diameter during the time said flash lamp means is activated.

* * * * *